United States Patent [19]

Tiedeman et al.

[11] Patent Number: 4,979,700
[45] Date of Patent: Dec. 25, 1990

[54] ROTARY ACTUATOR FOR LEADING EDGE FLAP OF AIRCRAFT

[75] Inventors: Robert K. Tiedeman, Wayne; Michael A. Palma, Parsippany, both of N.J.

[73] Assignee: Curtiss Wright Flight Systems, Inc., Fairfield, N.J.

[21] Appl. No.: 264,198

[22] Filed: Oct. 28, 1988

[51] Int. Cl.$^5$ .................................................. B64C 9/00
[52] U.S. Cl. ............................ 244/75 R; 244/90 R; 244/198; 244/201; 244/213; 244/219; 244/231
[58] Field of Search .................... 244/75 R, 231, 219, 244/213, 87, 89, 90 R, 198, 201, 217, 45 R, 46; 74/86, 98

[56] References Cited

U.S. PATENT DOCUMENTS

4,286,761 9/1981 Musgrove .................. 244/75 R

Primary Examiner—Charles T. Jordan
Assistant Examiner—Rochelle Lieberman
Attorney, Agent, or Firm—Klauber & Jackson

[57] ABSTRACT

A rotary geared actuator for pivotally connecting a flap to a wing of an aircraft, includes at least two adjacent actuator slices rotatably coupled together, each actuator slice including a sun gear rotatably coupled to a drive shaft and having gear teeth with a curved profile to enable movement of the actuator slices with respect to each other in conformance with bending of the wing, planetary gears in surrounding and meshing engagement with the gear teeth of the sun gear, a movable ring gear in surrounding and meshing engagement with the planetary gears, and a fixed ring gear in surrounding and meshing engagement with the planetary gears on opposite sides of the movable ring gear, each fixed ring gear being in meshing engagement only with planetary gears of one actuator slice; at least one fixed side tie bar connecting each fixed ring gear with the wing; at least one movable flap side tie bar connecting each movable ring gear with the flap; securing pins for securing each fixed side tie bar to one fixed ring gear and each movable flap side tie bar to one movable ring gear so as to permit a small axial movement between at least one tie bar and the respective fixed ring gear and/or movable ring gear; and a coupling shaft which flexibly connects an outermost sun gear of the actuator to a drive shaft.

19 Claims, 9 Drawing Sheets

ROTARY ACTUATOR FOR LEADING EDGE FLAP OF AIRCRAFT

BACKGROUND OF THE INVENTION

This invention relates generally to aircraft, and more particularly, is directed to a rotary actuator for a leading edge flap of an aircraft.

It is well known to attach a leading edge flap to a fixed aircraft wing using geared rotary actuators. Such geared rotary actuators transmit torque to the flap to permit movement thereof relative to the fixed aircraft wing. In addition, such geared rotary actuators function to transmit shear loads and axial loads from the movable flap to the fixed wing, which is better capable of withstanding such loads.

However, during maneuvering of the aircraft while in flight, loads encountered by the fixed wings can be as high as nine times the weight of the aircraft. Because the wings are typically thin and are used to deflect significant amounts of air when the air loads support the weight of the aircraft during flight thereof, the loads on the wings during the aforementioned maneuvering greatly increases the deflection or bending of the wings. This bending or deflection of the fixed wings results in such excess loads being imparted to the flaps through the rotary actuators, to make the flaps conform to the deflected wing shapes. Because the flaps are typically elongated, a plurality of rotary geared actuator slices are therefore necessary to carry the loads incurred during maneuvering of the aircraft in order to reposition the flaps during such flight maneuvering.

Typically, the rotary geared actuators are manufactured from high strength steels, while the fixed wings and the flaps are manufactured from lighter weight materials, such as aluminum, titanium and composite materials which may incorporate carbon or glass fibers. Thus, because of the greater stiffness of the rotary geared actuators, they are more resistant to bending. Since the high strength rotary geared actuators do not deflect as much as the wing or flap structure, they effectively transmit concentrated loads between the flaps and the fixed wings. Therefore, in practice, such loads have been transferred by means of the mountings for the rotary geared actuators. Thus, the mounting means for the high strength steel rotary geared actuators must distribute the imposed loads to the lower strength material used in the fixed wings and flaps, and must also be able to reposition the rotary geared actuators under maneuvering air loads.

Each rotary geared actuator is comprised of a plurality of actuator slices. A conventional single slice of a rotary geared actuator is comprised of fixed and movable internal gears which surround a plurality of planet or spindle gears, which in turn, are supported by support rings and bearings and are driven by a common sun gear which, in turn, is driven through a coupling by a drive shaft. This type of rotary geared actuator forms a rugged, integral gear box capable of transmitting torque and shear loads with good torsional stiffness.

It is typically necessary to gang or connect actuator slices together to provide a structure which can carry the torque loads that are encountered. Conventionally, when the actuator slices are ganged, a common end fixed gear is used for two adjacent actuator slices. However, this construction provides that the plurality of ganged slices together form an integral unit which is stiff or rigid in the axial direction. Accordingly, it is difficult for this long, rigid actuator to conform to the bending of the wing. In addition to the aforementioned air loads, temperature changes cause axial movements of the different parts. As a result, because of the rigid nature of the rotary geared actuators, the mountings for the rotary geared actuators must allow for wing and flap deflections under load.

Typically, each rotary geared actuator is mounted to a flap and a wing through the use of tie bar assemblies which do not permit axial movement of the rotary geared actuator. Thus, as the wing bends, the rotary geared actuator cannot move axially with respect to the wing, flap or tie bar assemblies, so that the bending load on the wing is transmitted from the tie bar, to the rotary geared actuator and then to the bolts which mount the rotary geared actuator. As a result, the bolts which secure the rotary geared actuators to the wings and flaps tend to loosen, causing failure. In other words, because of the rigid, unitary construction of the rotary geared actuators and the rigid connection to the wings and flaps through the tie bar assemblies, the weakest link in the connection are the bolts which secure the tie bar assemblies to the wings and flaps, and accordingly, the first elements to fail are the bolts.

With the aforementioned known structure, the rotary geared actuators are rigidly coupled through a coupling to a drive shaft. As the respective wing bends, the drive shaft also bends, because of the rigid connection of the rotary geared actuators to the drive shaft. This bending of the drive shafts makes operation of the rotary geared actuators difficult, and induces additional stresses thereon.

OBJECTS AND SUMMARY OF THE INVENTION

Accordingly, it is an object of the present invention to provide a rotary actuator for a leading edge flap of an aircraft that overcomes the aforementioned problems with the prior art.

It is another object of the present invention to provide a rotary actuator for a leading edge flap of an aircraft in which each actuator slice thereof can conform to wing bending and temperature changes independent of the other actuator slices.

It is still another object of the present invention to provide a rotary actuator for a leading edge flap of an aircraft in which the fixed gear of adjacent actuator slices is split to allow each actuator slice to independently conform to wing bending.

It is yet another object of the present invention to provide a rotary actuator for a leading edge flap of an aircraft in which each actuator slice is mounted to a flap and a wing through a separate pin to the tie bar assembly to permit conformance of each actuator slice to structural bending and other motions due to imposed loads.

It is a further object of the present invention to provide a rotary actuator for a leading edge flap of an aircraft in which each actuator slice is mounted to a flap and a wing through a separate tie bar assembly using pin joints which permit axial motion and deflections of the actuator slices to conform to the bending profile of the wing.

It is a still further object of the present invention to provide a rotary actuator for a leading edge flap of an aircraft in which the common rotary shaft for each rotary geared actuator is flexibly supported at each end to prevent bending of the shaft when individual actuator slices move to conform to the bending of the wing.

It is a yet further object of the present invention to provide a rotary actuator for a leading edge flap of an aircraft in which the common shaft has curved gear sections for mating with each sun gear, so as to permit good engagement at all times by the sun gear with the common rotary shaft, regardless of movement of each actuator slice to conform to the bending of the wing.

In accordance with an aspect of the present invention, a rotary geared actuator for pivotally connecting a flap to a wing of an aircraft, comprises at least two adjacent actuator slices rotatably connected together, each actuator slice including a sun gear rotatably coupled to a drive shaft, a plurality of planetary gears in surrounding and meshing engagement with the sun gear, a movable ring gear in surrounding and meshing engagement with the planetary gears, and a fixed ring gear in surrounding and meshing engagement with the planetary gears and positioned on opposite sides of the movable ring gear, each fixed ring gear being in meshing engagement only with planetary gears of one actuator slice; at least one fixed side tie bar means for connecting each fixed ring gear with either the wing or the flap; and at least one movable flap side tie bar means for connecting each movable ring gear with the other of the wing and the flap.

In accordance with another aspect of the present invention, a rotary geared actuator for pivotally connecting a flap to a wing of an aircraft, comprises at least two adjacent actuator slices rotatably connected together, each actuator slice including a sun gear rotatably coupled to a drive shaft, the sun gear including gear teeth extending thereabout, and the gear teeth having a curved profile to enable movement of the actuator slices with respect to each other in conformance with bending of the wing of the aircraft, a plurality of planetary gears in surrounding and meshing engagement with the gear teeth of the sun gear, a movable ring gear in surrounding and meshing engagement with the planetary gears, and a fixed ring gear in surrounding and meshing engagement with the planetary gears and positioned on opposite sides of the movable ring gear; at least one fixed side tie bar means for connecting each fixed ring gear with the wing or the flap; and at least one movable flap side tie bar means for connecting each movable ring gear with the other of the wing and the flap.

In accordance with still another aspect of the present invention, a rotary geared actuator for pivotally connecting a flap to a wing of an aircraft, comprises at least two adjacent actuator slices rotatably connected together, each actuator slice including a sun gear rotatably coupled to a drive shaft, a plurality of planetary gears in surrounding and meshing engagement with the first gear teeth of the sun gear, a movable ring gear in surrounding and meshing engagement with the planetary gears, and a fixed ring gear in surrounding and meshing engagement with the planetary gears and positioned on opposite sides of the movable ring gear; at least one fixed side tie bar means for connecting each fixed ring gear with the wing or the flap; at least one movable flap side tie bar means for connecting each movable ring gear with the other of the wing and the flap; and securing means for securing each fixed side tie bar means to one fixed ring gear and each movable flap side tie bar means to one movable ring gear so as to permit a small axial movement between at least one tie bar means and the respective fixed ring gear and/or movable ring gear.

In accordance with yet another aspect of the present invention, a rotary geared actuator for pivotally connecting a flap to a wing of an aircraft, comprises at least two adjacent actuator slices rotatably connected together, each actuator slice including a sun gear rotatably coupled to a drive shaft, a plurality of planetary gears in surrounding and meshing engagement with the first gear teeth of the sun gear, a movable ring gear in surrounding and meshing engagement with the planetary gears, and a fixed ring gear in surrounding and meshing engagement with the planetary gears and positioned on opposite sides of the movable ring gear; at least one fixed side tie bar means for connecting each fixed ring gear with the wing or the flap; at least one movable flap side tie bar means for connecting each movable ring gear with the other of the wing and the flap; and coupling means for coupling an outer one of the actuator slices to a drive shaft, the coupling means including a coupling shaft having an inner end and an outer free end, the outer free end of the coupling shaft including gear teeth having a part-spherical curvature, and the drive shaft including gear teeth having a curvature conforming to the gear teeth of the coupling shaft and in meshing engagement therewith, to provide a flexible drive coupling between the drive shaft and the coupling shaft, and coupling means for rotatably coupling the coupling shaft to the sun gear of the outer one of the actuator slices.

In accordance with a further aspect of the present invention, a rotary geared actuator for pivotally connecting a flap to a wing of an aircraft, comprises at least two adjacent actuator slices rotatably connected together, each actuator slice including a sun gear rotatably coupled to a drive shaft, the sun gear including gear teeth extending thereabout, and the gear teeth having a curved profile to enable movement of the actuator slices with respect to each other in conformance with bending of the wing of the aircraft, a plurality of planetary gears in surrounding and meshing engagement with the first gear teeth of the sun gear, a movable ring gear in surrounding and meshing engagement with the planetary gears, and a fixed ring gear in surrounding and meshing engagement with the planetary gears and positioned on opposite sides of the movable ring gear, each fixed ring gear being in meshing engagement only with planetary gears of one the actuator slice; at least one fixed side tie bar means for connecting each fixed ring gear with the wing or the flap; at least one movable flap side tie bar means for connecting each movable ring gear with the other of the wing and the flap; securing means for securing each fixed side tie bar means to one fixed ring gear and each movable flap side tie bar means to one movable ring gear so as to permit a small axial movement between at least one tie bar means and the respective fixed ring gear and/or movable ring gear; and coupling means for coupling an outer one of the actuator slices to a drive shaft, the coupling means including a coupling shaft having an inner end and an outer free end, the outer free end of the coupling shaft including gear teeth having a part-spherical curvature, and the drive shaft including gear teeth having a curvature conforming to the gear teeth of the coupling shaft and in meshing engagement therewith, to provide a flexible drive coupling between the drive shaft and the coupling shaft, and coupling gear means for rotatably coupling the coupling shaft to the sun gear of the outer one of the actuator slices.

The above and other objects, features and advantages of the present invention will become readily apparent from the following detailed description which is to be read in connection with the accompanying drawings.

DETAILED DESCRIPTION OF THE PREFERRED EMBODIMENTS

Figure 1:
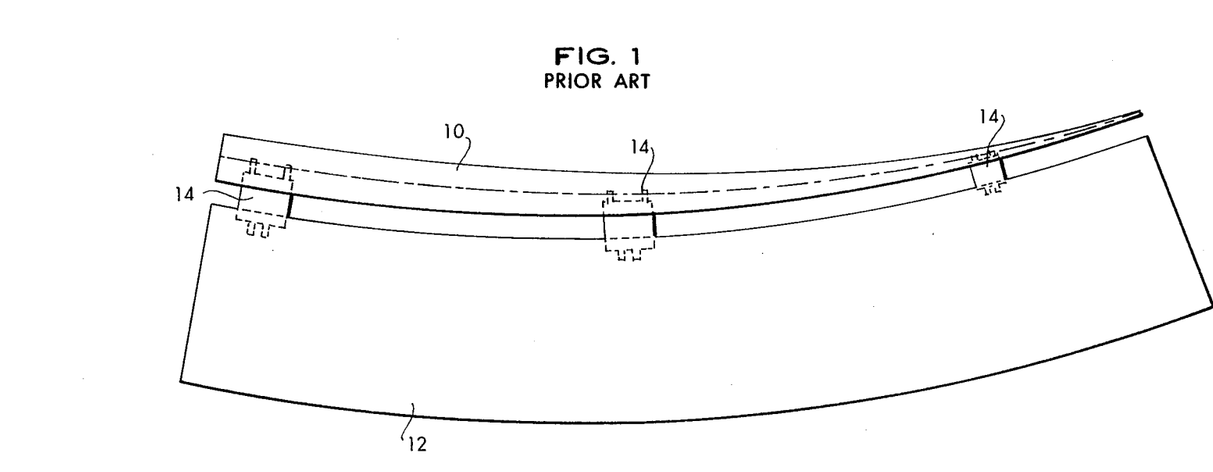
FIG. 1 is an elevational view of a wing and flap of an aircraft, pivotally secured together by a plurality of rotary geared actuators.
Figure 2:
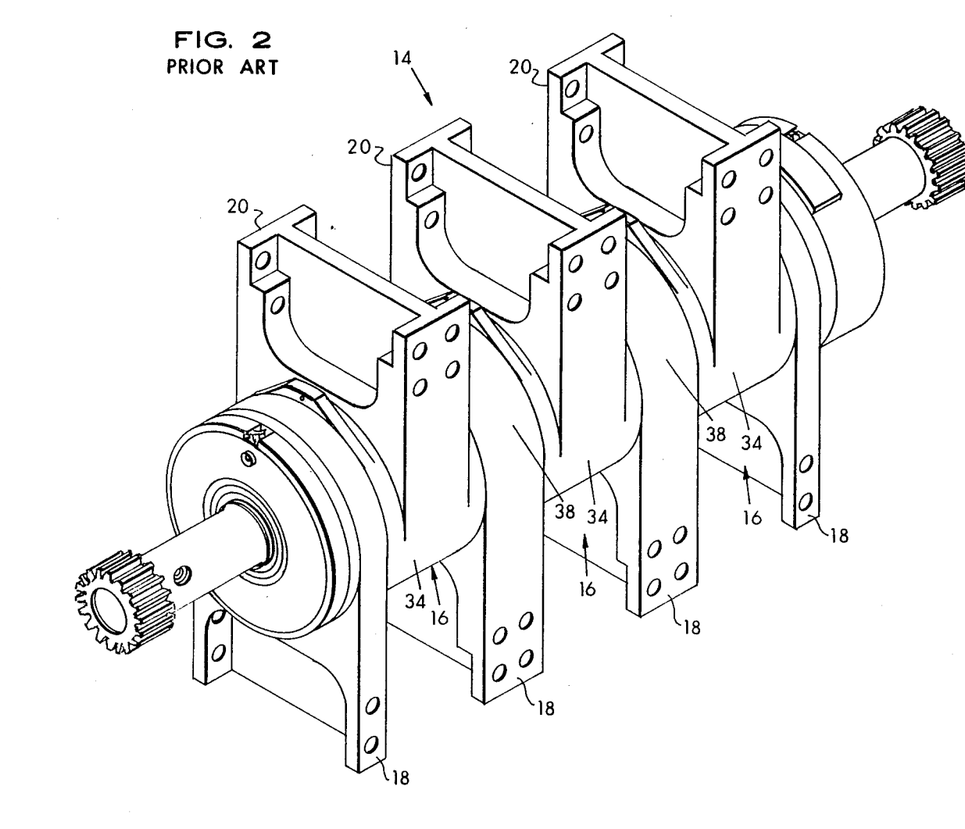
FIG. 2 is a perspective view of a rotary geared actuator according to the prior art.

Referring to the drawings in detail, and initially to FIG. 1, a wing 10 of an aircraft (not shown) has a leading edge flap 12 pivotally secured thereto by a plurality of rotary geared actuators 14, as is conventional. Each rotary geared actuator 14 includes a plurality of actuator slices 16 (FIG. 2) secured to wing 10 by fixed side tie bars 18 and secured to flap 12 by movable flap side tie bars 20. As shown in FIG. 1, as wing 10 bends, actuators 14 cause flap 12 to bend so as to conform to the bending of wing 10.

However, as described above, and in accordance with prior art structures, as wing 10 bends, rotary geared actuators 14 cannot move axially with respect to wing 10, flap 12 or tie bars 18 and 20, so that the bending load on wing 10 is transmitted from the tie bars 18 and 20, to rotary geared actuators 14 and then to the bolts (not shown) which mount tie bars 18 and 20, and which are the weakest link in the connections. As a result, the bolts which secure rotary geared actuators 14 to wing 10 and flap 12 tend to loosen, causing failure. In other words, because of the rigid, unitary construction of rotary geared actuators 14 and the rigid connection to wing 10 and flap 12 through tie bars 18 and 20, the weakest link in the connection are the bolts which secure tie bars 18 and 20 to wing 10 and flap 12, and accordingly, the first elements to fail are the bolts.

In order to better understand the present invention, two actuator slices 16 of a rotary geared actuator 14 (FIG. 4) according to the prior art will now be described with respect to FIG. 3, which is a simplified diagram for purposes of explanation only. As shown, a sun gear 22 of one actuator slice 16 is rotatably driven by a drive shaft (not shown) through an input coupling 24. This sun gear 22 is then coupled to the next adjacent sun gear 22 by a gear coupling 21 to drive the latter sun gear 22. Specifically, each sun gear 22 has a plurality of circumferentially arranged gear teeth 23 at each end thereof, with adjacent gear teeth 23 of adjacent sun gears 22 being rotatably coupled to each other by means of said gear coupling 21.

Each sun gear 22 also has a plurality of circumferentially arranged teeth 26 centrally arranged thereon, and a plurality (for example six) of planetary type spindle gears 28 are arranged in surrounding relation to each sun gear 22 such that central teeth 30 circumferentially and centrally arranged on each spindle gear 28 are in meshing engagement with central teeth 26 on sun gear 22. As a result, spindle gears 28 are rotated about the respective sun gear 22 and about their own central axes. Support rings 32 are provided about each sun gear 22 to hold spindle gears 28 in tight meshing engagement with sun gear 22.

A movable ring gear 34 is provided in surrounding relation to the spindle gears 28 of each actuator slice 16, each movable ring gear 34 having a plurality of inner gear teeth 36 in meshing engagement with central gear teeth 30 of spindle gears 28. A movable flap side tie bar 20 is secured to each movable ring gear 34.

A fixed ring gear 38 is also provided in surrounding relation to the spindle gears 28 of each actuator slice 16, each fixed ring gear 38 also having a plurality of inner gear teeth 40 which are in meshing engagement with end gear teeth 42 that are circumferentially arranged at the ends of each spindle gear 28. In addition, each movable ring gear . 34 is rotatable about sun gear 22 with respect to fixed ring gear 38 by means of ball bearings 44 positioned fixed ring gear 38, respectively.

Each fixed ring gear 38 has a fixed tie bar 18 secured thereto. Since each fixed tie bar 18 is also fixed to wing 10, fixed ring gear 38 is immovable. Since each spindle gear 28 is in meshing engagement with a rotary sun gear 22 and a fixed ring gear 38, rotation of sun gear 22 causes the spindle gears 28 therearound to rotate about sun gear 22 and about their own axes. Such rotation of spindle gears 28 cause rotation of movable ring gears 34 about the sun gear 22, to cause flap 12 to rotate with respect to wing 10.

Figure 3:
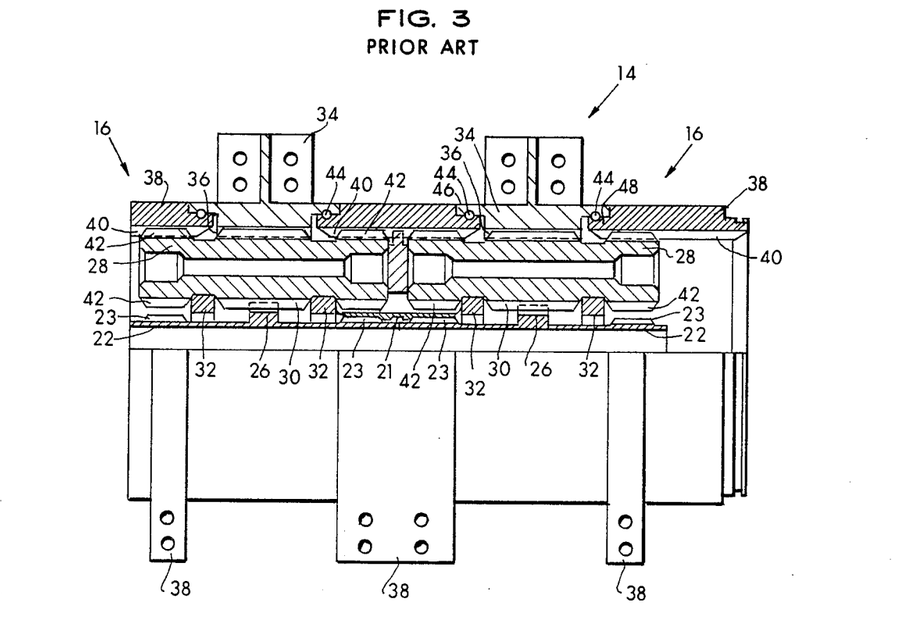
FIG. 3 is a longitudinal cross-sectional view of two actuator slices of the rotary geared actuator of FIG. 2.
Figure 4:
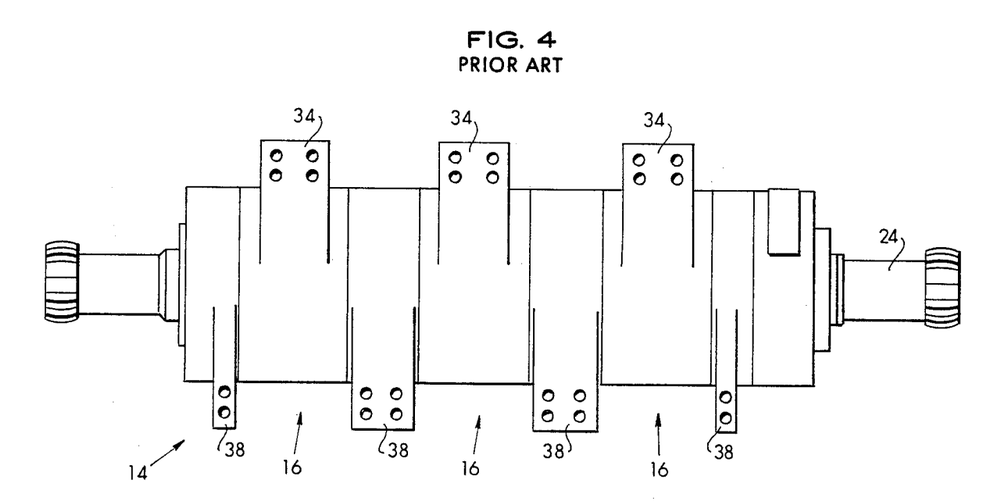
FIG. 4 is an elevational view of the rotary geared actuator of FIG. 2.

As shown in FIG. 3, and as described above, it is typically necessary to gang or connect actuator slices 16 together to provide a structure which can carry the torque loads that are encountered. Conventionally, when actuator slices 16 are ganged, a fixed ring gear 38 is used to engage spindle gears 28 of two adjacent actuator slices 16. However, this construction provides that the plurality of ganged slices 16 together form an integral unit which is stiff or rigid in the axial direction. Accordingly, it is difficult for this long, rigid actuator 14 to conform to the bending of wing 10. In addition to the aforementioned air loads, temperature changes cause axial movements of the different parts. As a result, because of the rigid nature of the rotary geared actuator 14 of FIGS. 3 and 4, the mounting specifically, the aforementioned bolts, for rotary geared actuators 14 take much of the load, and therefor to fail early.

Specifically, and as discussed above, each rotary geared actuator 14 is mounted to flap 12 and wing 10 through the use of tie bars 18 and 20 which do not permit axial movement of rotary geared actuator 14.

Figure 5:
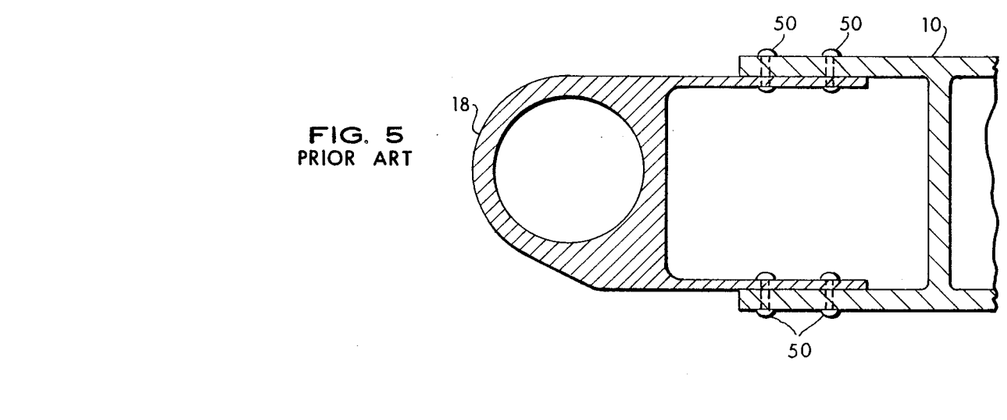
FIG. 5 is a cross-sectional view showing a fixed side tie bar connected by bolts to a wing of an aircraft.

Thus, as wing 10 bends, each rotary geared actuator 14 cannot move axially with respect to wing 10, flap 12 or tie bars 18 and 20, so that the bending load on wing 10 is transmitted to bolts 50 which mount tie bars 18 and 20 to wing 10 and flap 12, respectively, as shown schematically in FIG. 5, which only shows a fixed side tie bar 18 secured to wing 10. As a result, bolts 50 which secure tie bars 18 and 20 to wing 10 and flap 12 tend to loosen, causing failure. In other words, because of the rigid, unitary construction of rotary geared actuators 14 and the rigid connection to wing 10 and flap 12 through tie bars 18 and 20, the weakest link in the connection are bolts 50 which secure tie bars 18 and 20 to wing 10 and flap 12, and accordingly, the first elements to fail are bolts 50.

Figure 6:
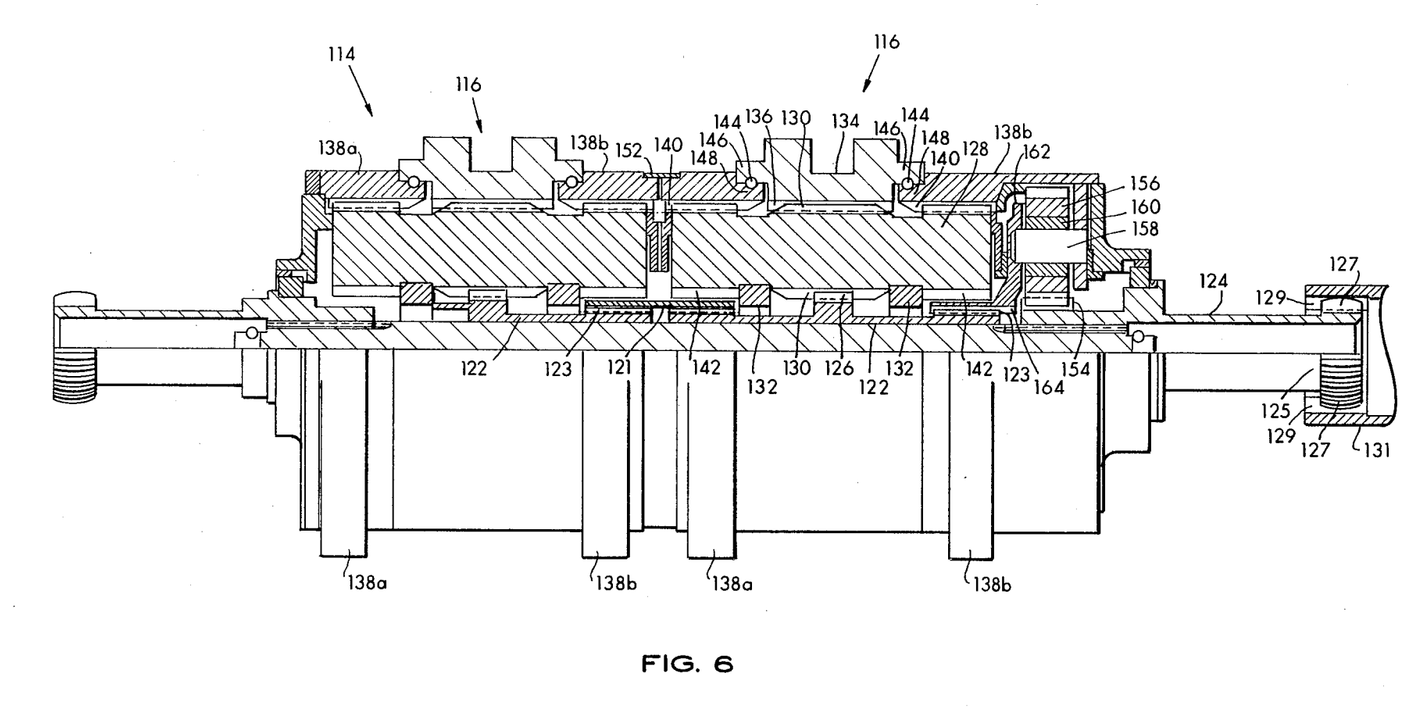
FIG. 6 is a partial longitudinal cross-sectional view of an inboard rotary geared actuator according to one embodiment of the present invention.
Figure 9:
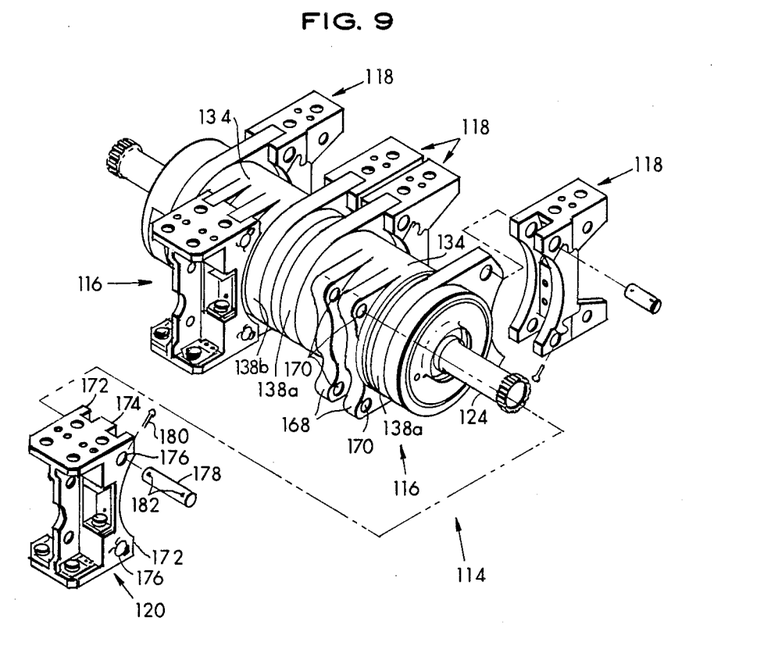
FIG. 9 is a longitudinal cross-sectional view of a sun gear of the rotary geared actuator of FIG. 6.

Referring now to FIGS. 6 and 9, a rotary geared actuator 114 according to an embodiment of the present invention will now be described in which elements corresponding to those described above with respect to the prior art of FIGS. 1-5 are identified by the same numerals, augmented by 100. Accordingly, a detailed description of such common elements will not be given.

Specifically, rotary geared actuator 114 differs from rotary geared actuator 14 in that there is no sharing of any fixed ring gear 138 between adjacent actuator slices 116. Specifically, there are two fixed ring gears 138a and 138b at the ends of each actuator slice 116, and such ring gears 138a and 138b do not overlap onto any other actuator slice 116. In this regard, a flexible annular centralizing seal 152 is positioned over the adjacent fixed ring gears 138a and 138b of adjacent actuator slices 114.

Figure 7:
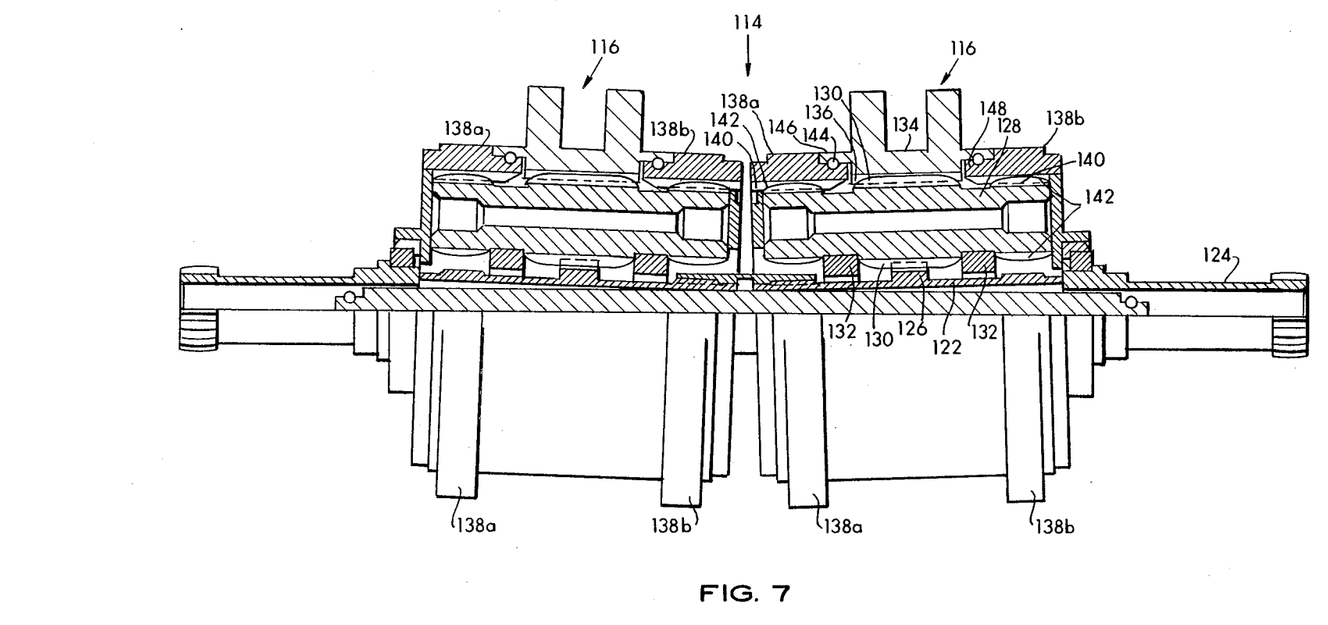
FIG. 7 is a simplified longitudinal cross-sectional view of the rotary geared actuator of FIG. 6, showing movement of two actuator slices thereof during bending of the wing.

Thus, as shown in the simplified view of FIG. 7, in which many parts are omitted for ease of illustration, during bending of wing 10, since actuator slices 116 are not rigidly connected by a common fixed ring gear, that is, since independent fixed ring gears 138a and 138b are provided at each end thereof, the actuator slices 116 can move (bend) with respect to each other. Thus, each actuator slice 116 is independent of other actuator slices 116 so that each actuator slice 116 can conform to bending of wing 10. This, of course, removes much of the force from bolts 50 which secure actuator 114 to wing 10 and flap 12, resulting in a much longer life thereof. Specifically, prior art actuators 14 generally have to be replaced after approximately 1,000 hours of flight service. On the other hand, actuators 114 according to the present invention have withstood side load testing on test stands which are intended to be equivalent to flight testing, for 16,000 hours.

In this regard, it will be appreciated that when the wing bends and the flap is rotated at an angle to the wing (other than in line), then the flap, if rigidly attached to wing, must be stretched axially. In other words, the connection between the wing and flap must allow sufficient axial freedom to avoid having to transfer the stretching loads to the wing structure. These stretching loads apply axial loads to the actuator which is between the flap and the wing. If sufficient axial motion is allowed by the connection to the actuator, then the axial loads may be avoided or minimized. Therefore, the distance between individual gear slices must be sufficient to minimize axial loads. Any additional distance or spacing between such gear slices may also be beneficial.

Figure 8:
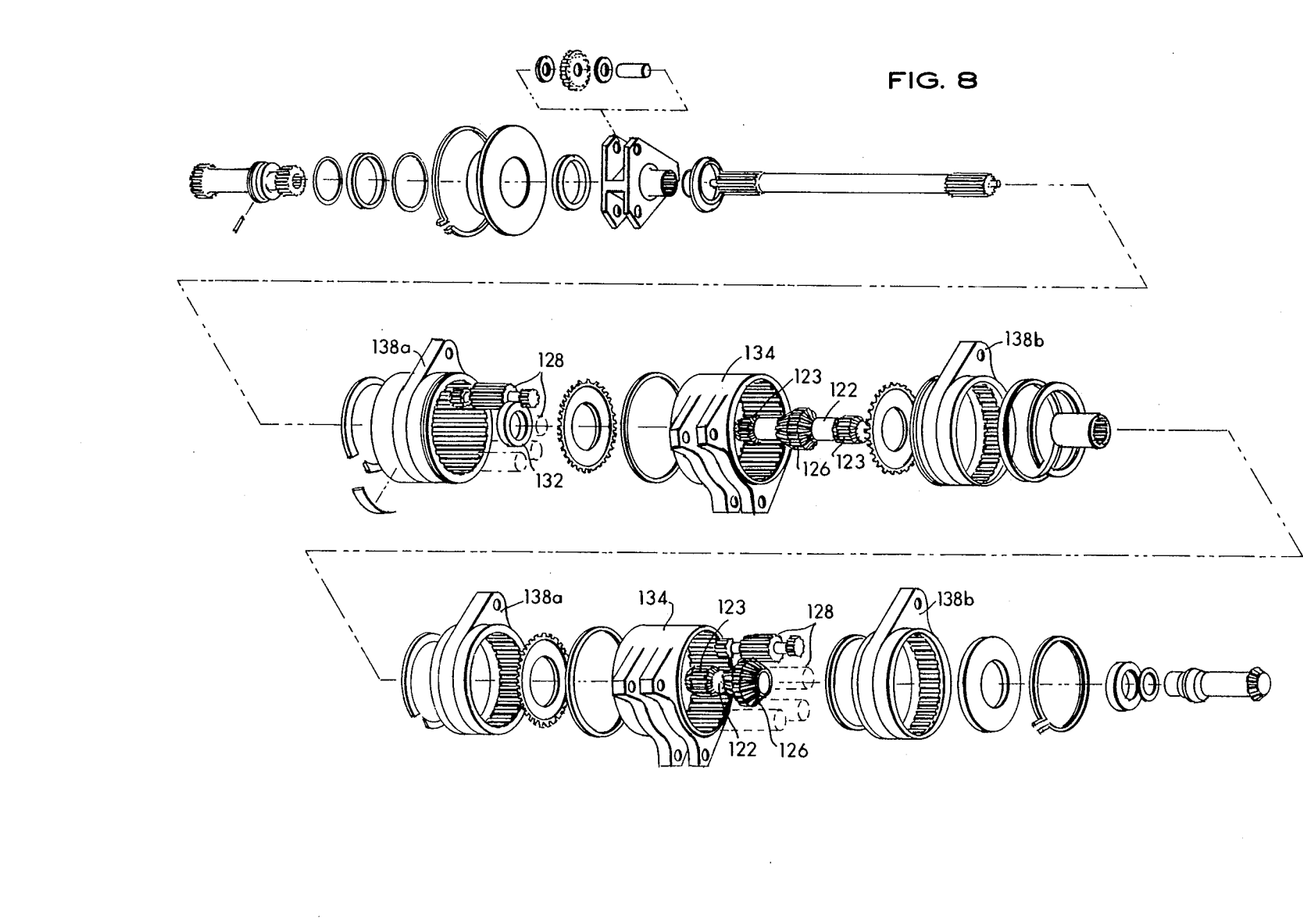
FIG. 8 is an exploded view of a portion of the rotary geared actuator of FIG. 6.

A partially exploded view of actuator 114 is shown in FIG. 8. As shown in FIGS. 6 and 8, a coupling shaft 124 is provided with gear teeth 154 at an inner end thereof.

A gear 156 is rotatably mounted on a fixed shaft 158 through bearings 160, and is in meshing engagement with gear teeth 154 of coupling shaft 124, so that gear 156 is rotated by coupling shaft 124. A splined carrier 162 is secured to an end face of gear 156 so as to rotate therewith, splined carrier 162 having gear teeth 164 which are in meshing engagement with end gear teeth 123 of the adjacent sun gear 122 so as to rotate the latter. In this manner, coupling shaft 124 is connected with the adjacent sun gear 122 to rotate the same. Of course, as in the prior art, adjacent sun gears 122 are rotatably coupled to each other by means of coupling 121.

Figure 10:
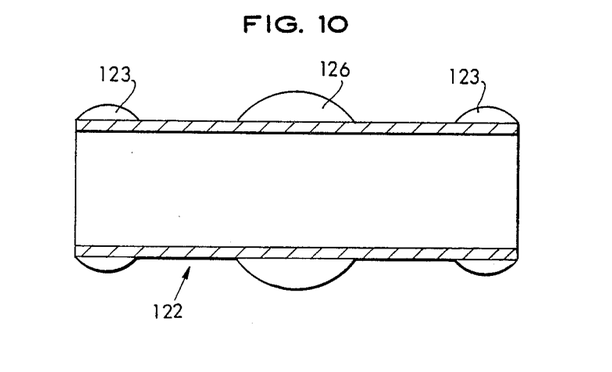
FIG. 10 is a partially exploded perspective view of the rotary geared actuator of FIG. 6.

In accordance with another aspect of the present invention, gear teeth 123 and 126 of each sun gear 122 have a part-spherical curvature, as shown best in FIGS. 8 and 10. Accordingly, as actuator slices 116 bend with wing 10, as shown in FIG. 7, because of the spherical spline or gearing of sun gear 122, no additional stresses are presented to actuator slices 116, and sun gear 122 remains in good meshing relation with spindle gears 128.

With prior art structures, each rotary geared actuators 14 is rigidly coupled through a coupling shaft 24 to a drive shaft (not shown). As the respective wing 10 bends, the drive shafts also bend, because of the rigid connection of rotary geared actuators 14 to the drive shafts. This makes operation of rotary geared actuators 14 difficult, and induces additional stresses thereon.

Thus, in accordance with another aspect of the present invention, each coupling shaft 124 is flexibly supported at each end to a drive shaft 131 (FIG. 6) to avoid bending of the drive shaft. Specifically, the free end 125 of each coupling shaft 124 has a plurality of gear teeth 127 circumferentially extending thereabout, with gear teeth 127 having a part-spherical profile, as shown in FIGS. 6 and 9. Accordingly, as shown specifically in FIG. 6, gear teeth 127 are engaged with part-spherical gear teeth 129 of a drive shaft 131 so as to be driven thereby, while permitting rotation of gear teeth 127 and 129 with respect to each other. Accordingly, as actuator slices 116 bend with wing 10, as shown in FIG. 7, gear teeth 127 and 129 slide with respect to each other, while maintaining positive engagement at all times. Accordingly, drive shaft 131 no longer bends with wing 10 so that rotation thereof is not hindered, and no additional stresses are induced in actuators 114.

It will be appreciated that the aforementioned bending or movement of actuator slices 116 with respect to each other is over a very small distance. However, to permit such movement, it is necessary to provide some axial clearance between actuator slices 116 and tie bars 118 and 120. In accordance with an aspect of the present invention, this is provided through the pin connection between actuator slices 116 and tie bars 118 and 120. Specifically, as shown in FIGS. 6, 8 and 9, each movable ring gear 134 is provided with two spaced ears 168 having aligned through bores 170 extending therethrough. Each tie bar 120, in like manner, is provided with two outer ears 172 and an inner ear 174 spaced from outer ears 172, with aligned through bores 176 extending through ears 172 and 174. In this manner, ears 172 and 174 are interleaved between ears 168, such that through bores 170 and 176 are aligned with each other. Then, supporting pins 178 are inserted through aligned bores 170 and 176 and secured therein by means of a cotter pin 180 or the like extending through holes 182 in opposite ends of pins 178, so as to secure tie bars 120 to movable ring gears 134. A similar arrangement is provided with tie bars 118 and fixed ring gears 138a and 138b.

Figure 11:
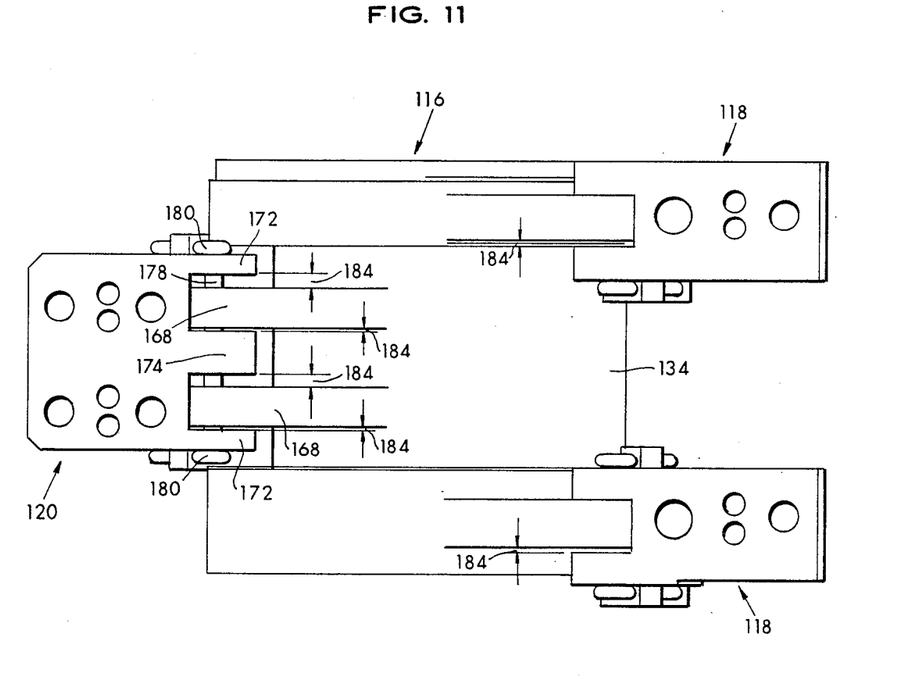
FIG. 11 is top plan view of one actuator slice of the rotary geared actuator of FIG. 6, showing the axial clearance gap between the tie bars and ring gears.

However, in accordance with another aspect of the present invention, such interleaved fit provides a small gap 184 between each of ears 172 and 174 and ears 168, as best shown in FIG. 11. Preferably, the maximum length of any gap 184 for each actuator slice 116 is approximately 0.15 inch. Accordingly, axial motion between each actuator slice 116 and tie bars 120 is achieved by sliding on supporting pin 178, to the extent of gaps 184. Thus, such sliding pin connection permits actuator slices 116 to conform the bending of wing 10 and stretching of flap 12 as flap is rotated down from the wing bending plane.

It will be appreciated that while the present invention has been disclosed with respect to an inboard rotary geared actuator 114 having two actuator slices 116, this may be varied. For example, with an outboard rotary geared actuator, there would be three actuator slices 116. Further, while the present invention has been described with respect to the movable gear connected with the flap and the fixed gear connected with the wing, the present invention is applicable to the reverse situation, that is, with the movable gear connected with the wing and the fixed gear connected with the flap. Also, while the present invention has been described with respect to a leading edge flap, it is not so limited, and may also be used with trailing edge flaps, spoilers, ailerons, doors and similar control surfaces.

Accordingly, the present invention provides a rotary actuator for a leading edge flap of an aircraft in which each actuator slice thereof can conform to wing bending and temperature changes independent-of the other actuator slices by splitting the fixed gear of adjacent actuator slices. Further, each actuator slice is mounted to a flap and a wing through a separate tie bar assembly using pin joints which permit axial motion and deflections of the actuator slices to conform to the bending profile of the wing. In addition, a drive shaft is flexibly connected to each end of each rotary geared actuator to prevent bending of the shaft when individual actuator slices move to conform to the bending of the wing. Still further, the sun gear of each actuator slice has curved gear sections so as to permit good engagement at all times by the sun gear with the spindle gears, regardless of movement of each actuator slice to conform to the bending of the wing.

Having described specific preferred embodiments of the invention with reference to the accompanying drawings, it will be appreciated that the present invention is not limited to those precise embodiments, and that various changes and modifications may be effected therein by one of ordinary skill in the art without departing from the scope or spirit of the invention as defined in the appended claims.

What is claimed is:

1. A rotary geared actuator for pivotally connecting a flap to a wing of an aircraft, comprising:
    at least two adjacent actuator slices rotatably connected together, each actuator slice including:
    a sun gear rotatably coupled to a drive shaft;
    a plurality of planetary gears in surrounding and meshing engagement with said sun gear;
    a movable ring gear in surrounding and meshing engagement with said planetary gears; and
    a fixed ring gear in surrounding and meshing engagement with said planetary gears and positioned on opposite sides of said movable ring gear, each fixed ring gear being in meshing engagement only with planetary gears of one said actuator slice;
    at least one fixed side tie bar means for connecting each said fixed ring gear with one of the wing and the flap; and
    at least one movable flap side tie bar means for connecting each said movable ring gear with the other of the wing and the flap.

2. A rotary geared actuator according to claim 1, wherein two fixed ring gears of two adjacent actuator slices are positioned adjacent to each other, and further including annular seal means positioned over said adjacent fixed ring gears to seal any gap therebetween.

3. A rotary geared actuator according to claim 1, wherein each said sun gear includes a first section having first gear teeth circumferentially extending thereabout and a first end section having second gear teeth circumferentially extending thereabout, with said first gear teeth being in meshing engagement with said planetary gears of the respective actuator slice, and further including connecting means engaged with said second gear teeth of adjacent actuator slices for rotatably coupling said sun gears of adjacent actuator slices together.

4. A rotary geared actuator according to claim 3, wherein at least one sun gear has a second opposite end section having third gear teeth circumferentially extending thereabout, said third gear teeth being in meshing engagement with coupling means for rotatably coupling said sun gears to a drive shaft.

5. A rotary geared actuator according to claim 3, wherein said first and second gear teeth are curved to enable movement of said actuator slices with respect to each other in conformance with bending of the wing of the aircraft.

6. A rotary geared actuator according to claim 5, wherein at least one sun gear has a second opposite end section having third gear teeth circumferentially extending thereabout, said third gear teeth being in meshing engagement with coupling means for rotatably coupling said sun gears to a drive shaft and said third gear teeth being curved to further enable movement of said actuator slices with respect to each other in conformance with bending of the wing of the aircraft.

7. A rotary geared actuator according to claim 1, further including securing means for securing each said fixed side tie bar means to said fixed ring gear and said movable flap side tie bar means to said movable ring gear so as to permit a small axial movement between at least one said tie bar means and the respective fixed ring gear and/or movable ring gear.

8. A rotary geared actuator according to claim 7, wherein
    each said fixed side tie bar means includes at least one ear having through bores extending there through,
    each said movable flap side tie bar means includes at least one ear having through bores extending there through,
    each said movable ring gear includes at least one ear having through bores extending there through,
    each said fixed ring gear includes at least one ear having through bores extending there through,
    said through bores in said ears of said fixed side tie bar means being in alignment with said through bores in said ears of said fixed ring gear when said fixed side tie bar means is connected with said fixed ring gear;
    said through bores in said ears of said movable flap side tie bar means being in alignment with said through bores in said ears of said movable ring gear when said movable flap side tie bar means is connected with said movable ring gear;

a gap is provided between adjacent ears of said fixed side tie bar means and said fixed ring gear and/or between adjacent ears of said movable flap side tie bar means and said movable ring gear; and said securing means includes supporting pin means extending through said aligned through bores to permit sliding axial movement between at least one said tie bar means and the respective fixed ring gear and/or movable ring gear.

9. A rotary geared actuator according to claim 1, further including coupling means for coupling an outer one of said actuator slices to a drive shaft, said coupling means including:

a coupling shaft having an inner end and an outer free end;

coupling gear means for rotatably coupling said coupling shaft to the sun gear of said outer one of said actuator slices.

10. A rotary geared actuator according to claim 9, wherein said outer free end of said coupling shaft includes gear teeth having a part-spherical curvature, and the drive shaft includes gear teeth having a curvature conforming to the gear teeth of said coupling shaft and in meshing engagement therewith, to provide a flexible drive coupling between the drive shaft and said coupling shaft.

11. A rotary geared actuator for pivotally connecting a flap to a wing of an aircraft, comprising:

at least two adjacent actuator slices rotatably connected together, each actuator slice including:

a sun gear rotatably coupled to a drive shaft, said sun gear including gear teeth extending thereabout, and said gear teeth having a curved profile to enable movement of said actuator slices with respect to each other in conformance with bending of the wing of the aircraft;

a plurality of planetary gears in surrounding and meshing engagement with said gear teeth of said sun gear;

a movable ring gear in surrounding and meshing engagement with said planetary gears; and a fixed ring gear in surrounding and meshing engagement with said planetary gears and positioned on opposite sides of said movable ring gear;

at least one fixed side tie bar means for connecting each said fixed ring gear with one of the wing and the flap; and at least one movable flap side tie bar means for connecting each said movable ring gear with the other of the wing and the flap.

12. A rotary geared actuator according to claim 11, wherein each said sun gear includes a first section having first gear teeth circumferentially extending thereabout and a first end section having second gear teeth circumferentially extending thereabout, with said first gear teeth being in meshing engagement with said planetary gears of the respective actuator slice, and further including connecting means engaged with said second gear teeth of adjacent actuator slices for rotatably coupling said sun gears of adjacent actuator slices together.

13. A rotary geared actuator according to claim 12, wherein at least one sun gear has a second opposite end section having third gear teeth circumferentially extending thereabout, said third gear teeth being in meshing engagement with coupling means for rotatably coupling said sun gears to a drive shaft.

14. A rotary geared actuator according to claim 12, wherein said first and second gear teeth are curved to enable movement of said actuator slices with respect to each other in conformance with bending of the wing of the aircraft.

15. A rotary geared actuator according to claim 14, wherein at least one sun gear has a second opposite end section having third gear teeth circumferentially extending thereabout, said third gear teeth being in meshing engagement with coupling means for rotatably coupling said sun gears to a drive shaft and said third gear teeth being curved to further enable movement of said actuator slices with respect to each other in conformance with bending of the wing of the aircraft.

16. A rotary geared actuator for pivotally connecting a flap to a wing of an aircraft, comprising:

at least two adjacent actuator slices rotatably connected together, each actuator slice including:

a sun gear rotatably coupled to a drive shaft;

a plurality of planetary gears in surrounding and meshing engagement with said first gear teeth of said sun gear;

a movable ring gear in surrounding and meshing engagement with said planetary gears; and a fixed ring gear in surrounding and meshing engagement with said planetary gears and positioned on opposite sides of said movable ring gear;

at least one fixed side tie bar means for connecting each said fixed ring gear with one of the wing and the flap;

at least one movable flap side tie bar means for connecting each said movable ring gear with the other of the wing and the flap; and securing means for securing each said fixed side tie bar means to one said fixed ring gear and each said movable flap side tie bar means to one said movable ring gear so as to permit a small axial movement between at least one said tie bar means and the respective fixed ring gear and/or movable ring gear.

17. A rotary geared actuator according to claim 16, wherein each said fixed side tie bar means includes at least one ear having through bores extending there through, each said movable flap side tie bar means includes at least one ear having through bores extending there through, each said movable ring gear includes at least one ear having through bores extending there through, each said fixed ring gear includes at least one ear having through bores extending there through, said through bores in said ears of said fixed side tie bar means being in alignment with said through bores in said ears of said fixed ring gear when said fixed side tie bar means is connected with said fixed ring gear;

said through bores in said ears of said movable flap side tie bar means being in alignment with said through bores in said ears of said movable ring gear when said movable flap side tie bar means is connected with said movable ring gear;

a gap is provided between adjacent ears of said fixed side tie bar means and said fixed ring gear and/or between adjacent ears of said movable flap side tie bar means and said movable ring gear; and said securing means includes supporting pin means extending through said aligned through bores to permit sliding axial movement between at least said one tie bar means and the respective fixed ring gear and/or movable ring gear.

18. A rotary geared actuator for pivotally connecting a flap to a wing of an aircraft, comprising:
- at least two adjacent actuator slices rotatably connected together, each actuator slice including:
  - a sun gear rotatably coupled to a drive shaft;
  - a plurality of planetary gears in surrounding and meshing engagement with said first gear teeth of said sun gear;
  - a movable ring gear in surrounding and meshing engagement with said planetary gears; and
  - a fixed ring gear in surrounding and meshing engagement with said planetary gears and positioned on opposite sides of said movable ring gear;
- at least one fixed side tie bar means for connecting each said fixed ring gear with one of the wing and the flap;
- at least one movable flap side tie bar means for connecting each said movable ring gear with the other of the wing and the flap; and
- coupling means for coupling an outer one of said actuator slices to a drive shaft, said coupling means including:
  - a coupling shaft having an inner end and an outer free end, said outer free end of said coupling shaft including gear teeth having a part-spherical curvature, and the drive shaft including gear teeth having a curvature conforming to the gear teeth of said coupling shaft and in meshing engagement therewith, to provide a flexible drive coupling between the drive shaft and said coupling shaft; and
  - coupling gear means for rotatably coupling said coupling shaft to the sun gear of said outer one of said actuator slices.

19. A rotary geared actuator for pivotally connecting a flap to a wing of an aircraft, comprising:
- at least two adjacent actuator slices rotatably connected together, each actuator slice including:
  - a sun gear rotatably coupled to a drive shaft, said sun gear including gear teeth extending thereabout, and said gear teeth having a curved profile to enable movement of said actuator slices with respect to each other in conformance with bending of the wing of the aircraft;
  - a plurality of planetary gears in surrounding and meshing engagement with said first gear teeth of said sun gear;
  - a movable ring gear in surrounding and meshing engagement with said planetary gears; and
  - a fixed ring gear in surrounding and meshing engagement with said planetary gears and positioned on opposite sides of said movable ring gear, each fixed ring gear being in meshing engagement only with planetary gears of one said actuator slice;
- at least one fixed side tie bar means for connecting each said fixed ring gear with one of the wing and the flap;
- at least one movable flap side tie bar means for connecting each said movable ring gear with the other of the wing and the flap;
- securing means for securing each said fixed side tie bar means to one said fixed ring gear and said movable flap side tie bar means to one said movable ring gear so as to permit a small axial movement between at least one said tie bar means and the respective fixed ring gear and/or movable ring gear; and
- coupling means for coupling an outer one of said actuator slices to a drive shaft, said coupling means including:
  - a coupling shaft having an inner end and an outer free end, said outer free end of said coupling shaft including gear teeth having a part-spherical curvature, and the drive shaft including gear teeth having a curvature conforming to the gear teeth of said coupling shaft and in meshing engagement therewith, to provide a flexible drive coupling between the drive shaft and said coupling shaft; and
  - coupling gear means for rotatably coupling said coupling shaft to the sun gear of said outer one of said actuator slices.

* * * * *